July 4, 1950
J. C. DUDLEY
2,513,789
DOOR SEAL
Filed April 30, 1948
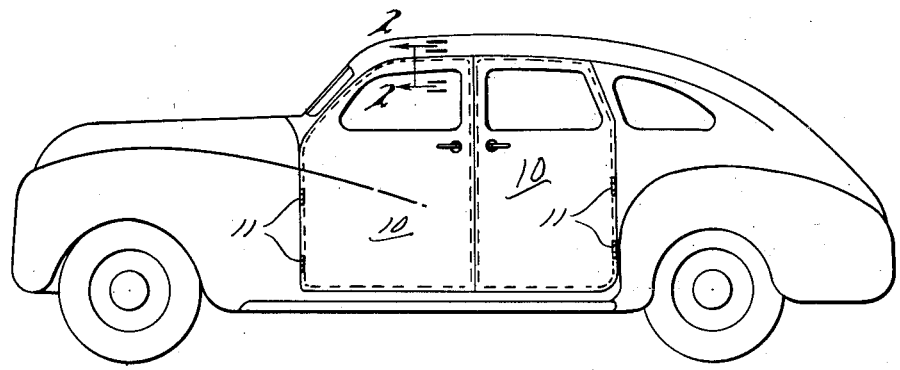
Fig. 1.
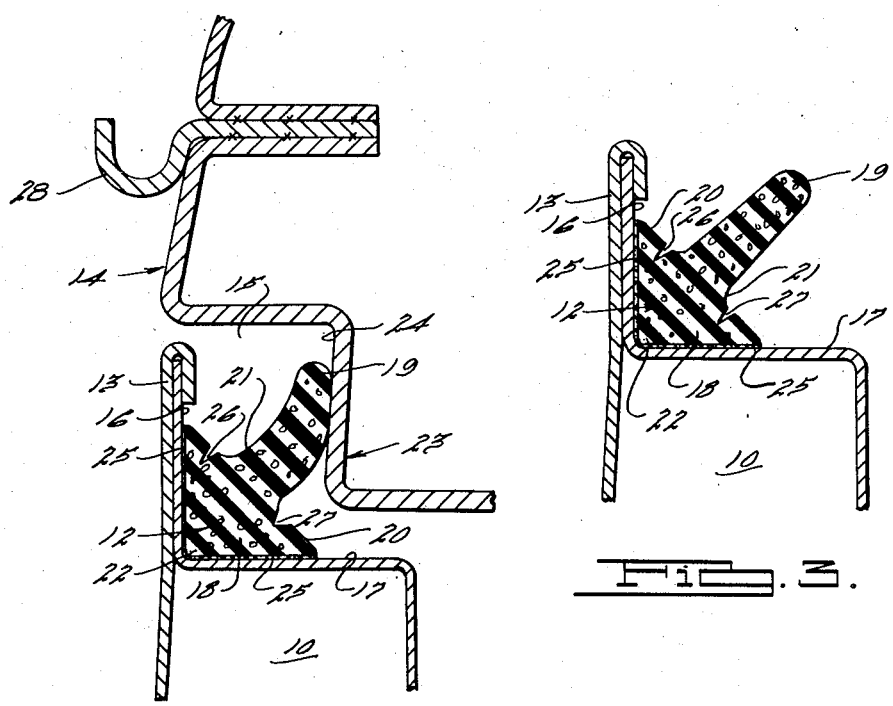
Fig. 2.
Fig. 3.
INVENTOR.
John C. Dudley.
BY
Harness and Harris.
ATTORNEYS Patented July 4, 1950

2,513,789

UNITED STATES PATENT OFFICE 2,513,789

DOOR SEAL

John C. Dudley, Highland Park, Mich., assignor to Chrysler Corporation, Highland Park, Mich., a corporation of Delaware Application April 30, 1948, Serial No. 24,289

6 Claims. (Cl. 296—44)

This invention relates to closure seals and has particular reference to automobile door seal constructions which provide an efficient, economical, durable seal that effectively cushions the closing of the door, eliminates the possibility of rattles between the door and its supporting framework and insures a substantially airtight seal around the entire door perimeter. The necessity for an airtight seal around a vehicle door has become of increasing importance due not only to the desire to eliminate drafts within the vehicle but also due to the fact that airtight interiors are essential for vehicles having interior heating and so-called air conditioning equipment.

In the past it has been quite common to use compression-type strips between the marginal flanges of the hinged vehicle doors and the supporting door frames. Some of the disadvantages of the compression-type seals are that they interfere with and provide a hard door closing action, they do not provide an efficient seal, for often they seal only at the high points and fail to seal at the low points along the door edges, and they require a more rugged and more expensive type of seal in order to withstand the destructive compressive forces set up during door closing action.

In an effort to overcome the disadvantages of the compression-type of seal, resilient, cantilever-type seals have been proposed. The cantilever-type of seal is designed to have the resilient sealing finger bent into sealing engagement with the supporting framework to thus tension the sealing finger against the framework. This bending of the sealing finger against the supporting framework provides a soft door closing action and insures an efficient seal at all points along the sealing joint. By using a cantilever-type seal it is possible to secure an airtight seal along the entire sealing joint, regardless of the variations in clearance along the joint and, furthermore, a less rugged, cheaper type of seal may be used due to the fact that the sealing strip is not required to withstand destructive compression forces but is merely tensioned against the supporting framework.

By forming the cantilever seal symmetrically so that the sealing finger projects from the base of the seal along a line that bisects the angle between the sides of the seal, the possibility of installing the seal incorrectly is eliminated and the speed with which such a seal can be installed is substantially increased. Broadly the use of a symmetrically-shaped cantilever-type of seal is disclosed in the application of Karl Pfeiffer, Serial No. 760,957, filed July 15, 1947. This application covers an improvement on the Pfeiffer design which improves the durability of the seal as well as the door closing action of a door embodying such a seal.

It has been found that as the sealing finger of a cantilever-type sealing strip is bent into sealing engagement with the supporting framework the base portion of the sealing strip adjacent its connection to the sealing finger becomes highly stressed. This stressing of the base portion of the sealing strip is transmitted to the bonded connection between the seal and its supporting member and tends to tear the base of the sealing strip away from the supporting edges of the door. Usually sealing strips of this type are connected to the edge of the supporting door by a suitable cement and the constant stressing of the cemented connection between the sealing strip and the door edge during door closing action is quite detrimental to the life of the bond. It has been found that by providing the base of the sealing strip with stress relieving indentations or grooves the life of the sealing strip is considerably increased and the bonded joint between the sealing strip and the edge of the supporting door is practically unaffected by door closing action. Not only do the stress-relieving indentations relieve the stresses in the base of the strip and in the bonded joint between the strip and the supporting member, but they also improve the hinging action of the sealing finger about the base portion of the strip. The increased flexibility of the sealing finger, due to the stress-relieveing indentations, provides a softer door closing action and at the same time tends to reduce the wear of the sealing finger and base portion during door closing action. As a result of the addition of stress-relieving indentations to the base of the cantilever-type sealing strip it is possible to materially improve the durability and efficiency of the strip without materially increasing its cost of manufacture or installation.

It is a primary object of this invention to provide a resilient sealing strip of the cantilever-type which includes means adapted to relieve the stresses set-up within the seal and the attaching bond as a result of the flexing of the sealing finger into engagement with the sealing wall. The stress relieving formations thus improve the durability of both the sealing strip and the bond between the strip and its supporting surface.

It is a further object of this invention to provide a resilient door seal of the cantilever-type which includes stress relieving formations adapted to improve the life of the seal as well as the flexibility of the sealing finger.

It is an additional object of this invention to provide an improved seal of a simplified form which is economical to manufacture and install, highly efficient in operation, durable, and subject to a minimum of wear.

Other objects and advantages of this invention will become apparent from the following description of my seal when considered in conjunction with the drawings in which:

Fig. 1 is a side view of an automobile equipped with a door cushioning and sealing means constructed in accordance with my invention;

Fig. 2 is an enlarged sectional elevational view taken along the line 2—2 of Fig. 1, indicating the position of the tensioned sealing finger and associated members after closing of the door; and Fig. 3 is an enlarged, sectional, elevational view of a door having my improved sealing strip mounted thereon, the seal being shown in the unstressed condition prior to swinging of the door into engagement with the door frame.

Each door 10, supported on the usual hinges 11, is provided with a cushioning and sealing strip 12. Sealing strip 12 is mounted on the side edge of the door adjacent the inside face of the door marginal flange 13. The door frame 14 has a continuous marginal recess 15 adapted to receive the sealing strip 12 and the flange 13 of the door so that the outside of the door will be substantially flush with the outside of the vehicle body when the door is closed. The flush relationship between the door and body is preferably maintained at all points around the door except along the top of the door where, as disclosed in Fig. 2, the body is preferably formed with an outwardly projecting gutter 28 to prevent drainage into the sealing joint between the door and the body. The sealing strip 12 will ordinarily be provided around the entire periphery of the door, the continuity of the strip being indicated by the dashed lines in Fig. 1. The strip 12 is preferably of molded sponge rubber or some similar resilient material and can be formed with an outer skin on its exposed surfaces to improve its wearing characteristics. The sealing strip 12 is cemented or otherwise suitably anchored to the inside wall 16 of the door flange 13 and to the side edge 17 of the door 10. The seal 12 is formed in cross section so that it is symmetrically shaped and comprises a substantially right-angled base portion 18 and a rearwardly projecting sealing finger 19. The flat-sided base portion 18 is adapted to be seated in the corner between the door flange 13 and the side edge 17 of the door. In cross section this base portion 18 is substantially of an isosceles triangular configuration having the rear base side or base wall 20 extending at approximately forty-five degrees with both base portion side walls that are seated against the door side wall 17 and the vertical door flange 13. The base portion 18 of the sealing strip 12 resembles in cross section an arrowhead and is adapted to have its pointed or vertex portion 22 seated in the corner between the flange 13 and edge 17. Extending outwardly from the medial region of the rear side 20 of the symmetrically shaped base portion 18 of the sealing strip, along a line which bisects the angle between the sides of the base portion, is the long, symmetrically shaped, sealing finger 19. The dimensions and shape of the sealing finger 19 are such as to form an elongated projection with a relatively narrow throat portion 21 which connects finger 19 to base portion 18 in such a manner as to provide the necessary hinging action between the sealing finger 19 and the base portion 18. The long sealing finger 19 insures a perfect seal, regardless of the variations in clearance between the door and the surrounding door frame. Due to the symmetrical design of the sealing strip 12, it is obvious that regardless of the way in which the base portion 18 of the sealing strip 12 is placed in the corner between the side edge 17 and the marginal flange 13 of the door, the sealing finger 19 will always project at the same angle and consequently will always function in the same manner. This symmetrical construction thereby eliminates the possibility of the sealing strip being installed in a reversed or backwards position so that the sealing finger 19 would extend at such an acute angle that it would be bent inwardly and compressed on door closing instead of being bent outwardly and tensioned against the wall 24 of door jamb 23.

As previously mentioned the application of Karl Pfeiffer, Serial No. 760,957, filed July 15, 1947 broadly discloses a symmetrically shaped, cantilever-type, sealing strip. This application covers a modification of the Pfeiffer seal which improves the durability and a sealing action of this type of seal. On bending the sealing finger 19 against the door jamb 23, on door closing movement, the finger 19 is pivoted about its connection to the base 18 and stresses and strains are set up within the base portion 18. These stresses not only deform the strip but they are transmitted to the bond 25 between the strip and the door edge and tend to destroy the bonded connection 25 and to tear the strip away from the door edge. Once the bonded connection begins to separate then the combined action of moisture, ice, snow and the stresses set up during door closing action quickly tear the seal from the door. It has been found that by placing stress-relieving grooves or indentations 26 and 27 along the base portion of the seal, adjacent the connection of the sealing finger to the base portion, that detrimental effects of the stresses set up by the pivoting of the sealing finger are substantially eliminated and furthermore the flexibility of the sealing finger is improved. The stress relieving indentations 26 and 27 not only prevent transmission of the bending stresses to the bond 25 but they also prevent the development of cracks in the base portion of the seal due to the pivotal movement of the sealing finger 19. As a result of the increased flexibility of the sealing finger 19, due to indentations 26 and 27, the seal gives a softer door closing action and is less susceptible to wear resulting from frictional engagement with the door jamb. Another advantage of the stress-relieving indentations or configurations is that they tend to relieve stresses set up within the seal due to bending of the seal about corners of the door or around sharply curved portions of the door during installation of the seal. These latter stresses tend to form cracks along the seal which are obviously detrimental. The increased flexibility of the seal herein disclosed tends to prevent deterioration of this type.

After the sealing strip 12 has been installed on the side edge of the door and anchored in place by a suitable adhesive, a coating or film of some air impervious, fast setting, preservative such as wax, butyl or neoprene rubber, lacquer, or a resin, may be applied to the exposed surfaces of those portions of the sealing strip which have become highly stressed due to their being bent around sharp corners or sharply curved portions along the door edge. The application of an air impervious coating to the more highly stressed portions of the sealing strip, immediately after installation of the strip, permits the stressed portions of the strip to set without exposure to the air and it has been found that such a process prevents cracking or other deterioration which otherwise might develop along the more highly stressed portions of the seal. In order to be most successful it is imperative that the air impervious coating be applied within approximately 24 hours after installation of the seal, for after that period of time the more highly stressed portions of the seal will have already set while exposed to the air and the cracks may have already developed.

I claim:

1. In a closure construction, a symmetrically shaped sealing strip of resilient material formed so as to provide in cross section a flat-sided base portion of a substantially right triangular configuration, a cantilever-type, symmetrically shaped sealing finger normal to and extending outwardly from the hypotenuse side of said base portion along a line that bisects the right angle between the sides of said base portion, and longitudinally extending V-shaped stress-relieving indentations formed in the hypotenuse side of said base portion adjacent each side of said sealing finger.

2. In a closure construction a sealing strip of resilient material formed in cross section to provide a flat sided, symmetrically shaped base portion of substantially right triangular configuration and a symmetrically shaped, cantilever-type, sealing finger extending outwardly from the medial portion of the hypotenuse side of said base portion, said hypotenuse side of said base portion including stress-relieving indentations positioned on opposite sides of said finger.

3. In an automobile body construction, a door frame having a jamb portion including a recess providing an exteriorly exposed, substantially vertical wall, a door hingedly mounted on said frame, said door having a substantially vertically extending, exterior, marginal flange arranged at right angles to the side edge of the door and adapted to be positioned in the door jamb recess when said door is in closed position, and a sealing strip of resilient material having pre-formed portions thereof bonded to the side edge of said door and to the inner side of said marginal flange, said sealing strip comprising a symmetrically shaped, flat-sided, right triangular base portion of suitable cross sectional configuration to fit within the corner between the side edge of the door and the marginal flange thereon, and a cantilever type, sealing finger extending outwardly from the medial portion of an exposed side of said base portion, said sealing finger being so constructed and arranged as to engage and be bent outwardly by the vertical wall of said jamb recess as the door is moved to closed position, said exposed side of said base portion having longitudinally extending grooves adjacent each side of the connection of the sealing finger to the base portion adapted to increase the flexibility of the sealing finger and to relieve the stresses within the base portion when the sealing finger is bent about the base portion on door closing movement.

4. In a closure construction, a sealing strip of resilient material formed in cross section to provide a symmetrically shaped, flat sided, base portion of substantially right triangular configuration having the hypotenuse wall thereof extending at approximately forty-five degrees with the side walls thereof, a symmetrically shaped, cantilever-type, sealing finger arranged to extend normal to said hypotenuse wall and extending outwardly from the medial portion thereof, and longitudinally extending indentations formed in the hypotenuse wall of said base portion so as to extend along opposite sides of said sealing finger, said indentations being adapted to increase the flexibility of said sealing finger and to relieve the stresses set up in said base portion due to flexing of said finger.

5. In an automobile door construction including a door frame having a jamb portion providing an exteriorly exposed, substantially vertical wall, a door hinged to said jamb having a right angled recess extending about the side edges thereof, a sealing strip of resilient material mounted in the right angled recess, said strip being formed in cross section to provide a flat sided, symmetrically shaped base portion of right triangular configuration and having a cantilever type, symmetrically shaped, sealing finger normal to and extending outwardly from the medial portion of the hypotenuse side of said base portion so as to substantially bisect the right angle of said base portion, said finger being adapted to be bent into sealing engagement with the vertical wall of the door jamb when the door is moved to closed position, and stress-relieving indentations formed in the hypotenuse side of said base portion adjacent each side of said sealing finger adapted to increase the flexibility of said finger.

6. In a closure construction, a sealing strip of resilient material formed in cross section to provide a symmetrically shaped, flat sided, base portion of substantially right triangular configuration having the hypotenuse wall thereof extending at approximately forty-five degrees with the side walls thereof, a symmetrically shaped, cantilever-type, sealing finger arranged to extend normal to said hypotenuse wall and extending outwardly from the medial portion thereof, and means associated with said base portion for increasing the flexibility of the sealing finger.

JOHN C. DUDLEY.

REFERENCES CITED

The following references are of record in the file of this patent:

UNITED STATES PATENTS

| Number | Name | Date |
|---|---|---|
| 1,991,674 | Hughes | Feb. 19, 1935 |
| 2,219,382 | Conlon | Oct. 29, 1940 |

FOREIGN PATENTS

| Number | Country | Date |
|---|---|---|
| 746,666 | France | Mar. 14, 1933 |

Certificate of Correction

Patent No. 2,513,789                                         July 4, 1950

JOHN C. DUDLEY

It is hereby certified that error appears in the printed specification of the above numbered patent requiring correction as follows:

Column 1, line 16, before the word "strips" insert *sealing*; column 2, line 33, for "stress-relieveing" read *stress-relieving*;

and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*